US009418402B2

(12) United States Patent
Hong et al.

(10) Patent No.: US 9,418,402 B2
(45) Date of Patent: Aug. 16, 2016

(54) SYSTEM FOR IMPROVING FOGGY LUMINANCE IMAGE USING FOG REDUCTION ESTIMATION MODEL (71) Applicant: INDUSTRY FOUNDATION OF CHONNAM NATIONAL UNIVERSITY, Gwangju (KR)

(72) Inventors: Sung Hoon Hong, Gwangju (KR); Jae Won Lee, Gwangju (KR)

(73) Assignee: Industry Foundation of Chonnam National University, Gwangju (KR)

( * ) Notice: Subject to any disclaimer, the term of this patent is extended or adjusted under 35 U.S.C. 154(b) by 0 days.

(21) Appl. No.: 14/407,092

(22) PCT Filed: Nov. 15, 2013

(86) PCT No.: PCT/KR2013/010407
§ 371 (c)(1),
(2) Date: Dec. 11, 2014

(87) PCT Pub. No.: WO2014/142417
PCT Pub. Date: Sep. 18, 2014

(65) Prior Publication Data
US 2015/0161769 A1    Jun. 11, 2015

(30) Foreign Application Priority Data

Mar. 11, 2013  (KR) .................. 10-2013-0025544

(51) Int. Cl.
*G06K 9/40*    (2006.01)
*G06T 5/00*    (2006.01)
(Continued)

(52) U.S. Cl.
CPC ............. *G06T 5/00* (2013.01); *G06K 9/00771* (2013.01); *G06K 9/4661* (2013.01); *G06T 5/003* (2013.01); *G06T 7/00* (2013.01); *G06T 2207/10024* (2013.01); *G06T 2207/10032* (2013.01)

(58) Field of Classification Search
CPC ............. G06T 5/20; G06T 5/007; G06T 5/00; G06T 5/003; G06T 5/002; G06T 7/00; G06T 7/0018; G06T 2207/10024; G06T 2207/20012; G06T 2207/10016; G06T 2207/20164; G06T 2207/30204; G06T 2207/30236; G06T 2207/30252; G06K 9/4661; G06K 9/00798; G06K 9/00818; G06K 9/209
USPC ............................................................ 382/274
See application file for complete search history.

(56) References Cited

U.S. PATENT DOCUMENTS 6,625,723 B1 *   9/2003 Jourday et al. ................ 712/217
8,396,324 B2     3/2013 Kang et al.
(Continued)

FOREIGN PATENT DOCUMENTS

KR   10-2010-0021952 A    2/2010
KR   10-2011-0050775 A    5/2011
KR   10-2012-0079564 A    7/2012

OTHER PUBLICATIONS

Yoav Y. Schechner et al., "Instant Dehazing of Images Using Polarization", Proc. Computer Vision & Pattern Recognition, Dec. 2001, pp. 325-332, vol. 1.
(Continued)

*Primary Examiner* — Ali Bayat
(74) *Attorney, Agent, or Firm* — Rabin & Berdo, P.C.

(57) ABSTRACT

The present invention provides a method for providing an image having visibility which is improved by removing fog or smoke from an image of which the quality is reduced due to the fog or the smoke. To this end, the present invention provides an estimation model used for obtaining, from an input image, an image from which the fog is removed, calculates a transmission rate indicating a ratio by which the fog is included in the original image by using the estimation model, and obtains an image of which the fog is removed using the calculated transmission rate. The method proposed in the present invention does not commonly use a filter and only uses calculation of a pixel unit, so that a back lighting effect is not generated, real time processing is possible due to a small amount of calculation, and a good image is obtained even by performing a process using only a luminance image. Therefore, the method can be applied to all multimedia devices in which real time processing is required, such as a monitoring system, a black box, a digital camera, etc.

7 Claims, 4 Drawing Sheets (51) Int. Cl.
*G06K 9/46* (2006.01)
*G06T 7/00* (2006.01)
*G06K 9/00* (2006.01)

(56) References Cited

U.S. PATENT DOCUMENTS

| | | | |
|---|---|---|---|
| 2005/0069207 A1* | 3/2005 | Zakrzewski et al. | 382/190 |
| 2010/0040300 A1 | 2/2010 | Kang et al. | |
| 2012/0022779 A1* | 1/2012 | Lee | 701/207 |
| 2012/0213436 A1* | 8/2012 | Grindstaff et al. | 382/167 |
| 2014/0247968 A1* | 9/2014 | Pavlic | 382/104 |

OTHER PUBLICATIONS

Sarit Shwartz et al., "Blind Haze Separation", Proc. IEEE Computer Vision and Pattern Recognition (CVPR), Oct. 2006, pp. 1984-1991, vol. II.

Srinivasa G. Narasimhan et al., "Chromatic Framework for Vision in Bad Weather", Proc. CVPR, Jun. 2000, pp. 598-605.

Srinivasa G. Narasimhan et al., "Contrast Restoration of Weather Degraded Images", IEEE Transactions on Pattern Analysis and Machine Intelligence, Jun. 2003, pp. 713-724, vol. 25, No. 6.

Shree K. Nayar et al., "Vision in Bad Weather", Proc. ICCV, Sep. 1999, pp. 820-827.

Johannes Kopf et al., "Deep Photo: Model-Based Photograph Enhancement and Viewing", ACM Trans. Graphics, Dec. 2008, pp. 1-10, vol. 27, No. 5.

Srinivasa G. Narasimhan et al., "Interactive (De)Weathering of an Image using Physical Models", In Workshop on Color and Photometric Methods in Computer Vision, Oct. 2003, pp. 1-8.

Robby T. Tan, "Visibility in Bad Weather from a Single Image", Proc. CVPR, Jun. 2008, pp. 1-8.

Raanan Fattal, "Single Image Dehazing", ACM Trans. Graphics, Aug. 2008, pp. 1-9, vol. 27, No. 3.

Kaiming He et al., "Single Image Haze Removal Using Dark Channel Prior", Proc. CVPR, Jun. 2009, pp. 1956-1963.

* cited by examiner

SYSTEM FOR IMPROVING FOGGY LUMINANCE IMAGE USING FOG REDUCTION ESTIMATION MODEL

TECHNICAL FIELD

The present invention relates to a system for providing an image having visibility which is improved by removing fog or smoke from a luminance image of which the quality is reduced, in particular to a system for solving the difficulty of real time processing by a large amount of calculation, a back lighting effect generated by large size filter, and degraded performance of fog elimination in case of using only luminance image in the conventional method.

BACKGROUND ART

Recently, an image monitoring system or an image black box for automobiles, or the like is used for detection or prevention of accidents. Also, in case of safety automobile of high technology under process is study for providing accident warning such as lane deviation, car collision by using computer vision with image acquired by a video camera.

In order to acquire good image in result from image processing or computer vision application, clean input image is needed. Particularly, when detecting or estimating an object, or using edge information of an image, the cleaner image will bring better result. However, in case of image acquired from the outdoor, light and color acquired from an object are mixed with brightness and color in the air, so that they have color which is different from original color. Particularly, with other color group such as fog and smoke, it is difficult to acquire original color and shape of an object.

When acquiring image through a device such as a camera, etc. under intensely foggy weather condition, objects have respectively different colors in the acquired image according to intensity of the fog, though their original colors are same. As more intense fog increases the ratio of fog, an object in acquired image loses much of its original color and has color which is similar to the fog. Thus, computer vision algorithm cannot provide good result in severely foggy area. Thus, there have been various methods proposed for making a foggy image similar to an image acquired when there is no fog by improving a foggy image. Those methods include a method using a plurality of images, or a method using additional information besides to images, etc. Recently, there is a method being proposed for removing the fog through an image and recovering an image.

As for the conventional method for improving an image which includes fog and etc., there is Korea Patent Publication No. 10-2010-0021952 (hereinafter, 'prior art') in addition to a plurality of applications published and disclosed.

The method according to the prior art comprises a step of receiving the first luminance image of an image including Airlight, and producing a map of atmosphere Airlight based on the ratio of the standard deviation and the average of the first luminance image; and a step of outputting the second luminance image from which the atmosphere Airlight is removed by reducing a map of atmosphere Airlight produced in the first luminance image. However, in the prior art a foggy image process is not performed by pixel unit On the other hand, in order to recover a foggy image into a clean image, a method using multiple images or using additional information in addition to an image is general. First, for the method using multiple images, there is a method [1, 2] using polarization of light, wherein two images are acquired by photographing with respectively different polarization filter installed in precisely same location. As fog value modified by polarization is different, polarized fog is removed by using the result of polarization value calculation through a method measuring polarized amount. Although this method provides very good image in result, there is a strong limitation that respectively different polarization filters have to be used in the same location.

In a method [3, 4, 5] using simply multiple images without using polarization filter, fog information is obtained from an image by using multiple images taken under different weather environment from the same location. This method [3, 4, 5] obtains fog value from two images which have different brightness by fog value in the same location, and removes the fog by using a method for acquiring fog depth information by using the obtained fog value.

A method for removing fog by using depth information of an image instead of using multiple images was also proposed. Kopf, et al. [6] acquires depth or texture information, on photographing images by using such as GPS information embedded in a camera. Acquired depth information is assumed as concentration (density) of fog value.

In all those conventional methods, fog is removed by using multiple images or using additional information in addition to an image in case of using a single image. However, these methods have the defect that they need to secure image data in various conditions and cannot be adapted to a dynamically-moving camera. Thus a method for removing for with a single image is being studied.

Tan proposed a method for removing fog by increasing contrast in [8]. That is, fog is removed by using the characteristic that a clean image without fog has higher edge strength than a foggy image and fog value is not sharply changed. This method highly improves brightness contrast, thus advantageously reveals clearly shape and structure of the image. But excessive increase of contrast causes saturation phenomena. And halo effect may occur in the region where the depth information is largely different.

Fattal measured reflection ratio of an image in [9], proposed an algorithm for removing fog and restoring an image through assumption that reflection ratio measured within constant image region has always the same vector direction. He et al., proposed a method [10] which removes fog by using the characteristic that a clean image has a higher chroma of color than a foggy image does. As in case of a clean image without fog, a pixel with high color sharpness has a very low channel value of one of R, G, B values, a method for removing the fog was proposed using observation that there are pixels having very low channel value in some area in case of a color image without fog.

However, in case only a luminance image is used because RGB color is used in the conventional method using a single image, fog-elimination performance is much degraded. As a large size filter is used, a back lighting effect occurs and a large calculation amount is required. Thus there is difficulty in real time processing.

[1] Y. Y. Schechner, S. G. Narasimhan, and S. K. Nayar, "Instant dehazing of images using polarization," in Proc. CVPR, pp. 325-332, Hawaii, USA, December 2001.

[2] S. Shwartz, E. Namer, and Y. Y. Schechner, "Blind haze separation," in Proc. CVPR, pp. 1984-1991, New York, USA, October 2006.

[3] S. G. Narasimhan and S. K. Nayar, "Chromatic framework for vision in bad weather," in Proc. CVPR, pp. 598-605, SC, USA, June 2000.

[4] S. G. Narasimhan and S. K. Nayar, "Contrast restoration of weather degraded images," IEEE Trans. Pattern Anal. Mach. Intell., vol. 25, no. 6, pp. 713-724, June 2003.

[5] S. K. Nayar and S. G. Narasimhan, "Vision in bad weather," in Proc. ICCV, pp. 820-827, Corfu, Greece, September 1999.
[6] J. Kopf, B. Neubert, B. Chen, M. Cohen, D. Cohen-Or, O. Deussen, M. Uyttendaele, and D. Lischinski, "Deep photo: Model-based photograph enhancement and viewing," ACM Trans. Graphics, vol. 27, no. 5, pp. 1-10, December 2008.
[7] S. G. Narasimhan and S. K. Nayar, "Interactive deweathering of an image using physical models," In Workshop on Color and Photometirc Methods in Computer Vision, October 2003
[8] R. Tan, "Visibility in bad weather from a single image," in Proc CVPR, pp. 1-8, Alaska, USA, June 2008.
[9] R. Fattal, "Single image dehazing," ACM Trans. Graphics, vol. 27, no. 3, pp. 1-9, August 2008.
[10] K. He, J. Sun, and X. Tang, "Single image haze removal using dark channel prior," in Proc. CVPR, pp. 1956-1963, Miami, USA, June 2009.

DISCLOSURE

Technical Problem

The present invention has been made keeping in mind the above problems, and the purpose of the present invention is to provide a clean image by removing brightness and color component in the air for an image having lowered visibility due to mixture of light and color component of an object and light and color component in the air such as fog, smoke, cloud and the like.

The conventional method for removing fog uses each R, G, B component, and in case of using only brightness component, performance is degraded. But, color coordinate system currently used in most multimedia system uses brightness signal and color difference signal like YCbCr color coordinate system, unlike RGB coordinate system. Thus, in order to adapt a conventional method, conversion process of color coordinate system is needed and color change can occur if an independent process for each R, G, B signal component is performed. Also as a large size filter is used in a conventional method for removing fog, a back lighting effect occurs. And a large calculation amount is required, thus there is difficulty in real time processing.

In order to solve a problem occurring in the conventional method, the present invention provides an estimation model for obtaining, an image from which the fog is removed from an input luminance image, calculates transmission rate indicating a ratio by which the fog is included in the original image, and obtains a fog-eliminated image by using calculated transmission rate, The method proposed in the present invention does not commonly use a filter and only uses calculation by pixel unit. Thus a back lighting effect and large calculation amount problems in the conventional method can be solved.

Technical Solution

The present invention for accomplishing these technical purposes relates to a system for improving foggy luminance image using fog reduction estimation model, comprising fog-eliminated image estimation value calculation unit for receiving the foggy input image and calculating estimation value of pixel of which the fog is removed; transmission rate calculation unit for calculating estimation value of transmission rate and a lowest limit value of transmission rate by using input image and estimation value of fog-eliminated pixel, and calculating the transmission rate to be used for restoration of fog-eliminated image by weighted sum of the calculated estimation value of transmission rate and lowest limit value of transmission rate; and restoration image output unit for outputting restored image of which the fog is removed by using the input image and transmission rate calculated by the transmission rate calculation unit.

Advantageous Effects

According to the present invention as described above, a clean image is provided by removing brightness and color component in the air for an image having lowered visibility due to mixture of light and color component of an object and light and color component in the air such as fog, smoke, cloud and the like. Currently color coordinate system used in most multimedia system uses brightness signal and color difference signal like YCbCr color coordinate system unlike RGB coordinate system. Thus the proposed method which has excellent performance with only brightness information is easy to adapt to multimedia system without conversion process of color coordinate system and able to maintain the color of the input color. In particular, the present invention can solve the problem related to a back lighting effect of the conventional method that uses the large size filter and a large calculation amount because the present invention performs pixel-unit operation. Thus it can be applied to real time applications.

Thus, in case of applying to a high resolution monitoring system, an image black box for automobile, fire prevention system, and the like, lowered visibility problem due to fog or smoke can be solved. And it can apply to safety vehicle which is recently under a lot of study.

DESCRIPTION OF REFERENCE CHARACTERS

S: System for improving foggy luminance image using fog reduction estimation model
100: Fog-eliminated image estimation value calculation unit
200: Transmission rate calculation unit
300: Restoration image output unit
400: Post-process unit
210: Transmission rate estimation module
220: Transmission rate lowest limit value calculation module
230: Weighted sum calculation module

BEST MODE

Specific features and advantages of the present invention will be more clearly understood from the following detailed description when taken in conjunction with the accompanying drawings. In the following description, it is to be noted that, when the functions of conventional elements and the detailed description of elements related with the present invention may make the gist of the present invention unclear, a detailed description thereof will be omitted.

Hereinafter, with reference to the accompanying drawings, the present invention is described in details.

With reference to FIGS. 1 to 4, a system for improving foggy luminance image using fog reduction estimation model according to the present invention is described below.

Methods for eliminating the fog by using a single image use the following fog modeling equation in common.

$$I_h(x)=I(x)t(x)+I_\infty(1-t(x)) \quad \text{[Equation 1]}$$

[Equation 1] is respectively defined for each R, G, B channel; $I_h(x)$ is $x_{th}$ pixel value of an image acquired through a camera, I(x) is fog-eliminated clean image, $I_\infty$ is fog inclusion amount of input image, t(x) is transmission indicating the ratio by which clean image and fog value are composed.

Thus, eliminating fog of an image is to obtain $I_\infty$ and t(x) from the input image $I_h(x)$ acquired by camera, and restore I(x) of which fog is eliminated finally.

Transmission rate t(x) and fog-eliminated image I(x) can be obtained respectively from [equation 2] and [equation 3] below.

$$t(x) = \frac{I_h(x) - I_\infty}{I(x) - I_\infty} \quad \text{[Equation 2]}$$

$$I(x) = \frac{I_h(x) - I_\infty}{t(x)} + I_\infty \quad \text{[Equation 3]}$$

In general, transmission rate t(x) is decreased exponentially in proportion to distance as in [equation 4] below.

$$t(x)=e^{-\beta d(x)}, \quad \text{[Equation 4]}$$

wherein β is scattering coefficient of air, d(x) is distance between a point in space corresponding to $x_{th}$, pixel and a camera.

Thus, in case it is foggy constantly, transmission rate of distant place such as sky reaches 0. Thus, from [equation 1] input image $I_h(x) \cong I_\infty$. As transmission rate of pixel in very close distance reaches 1, $I_h(x) \cong I(x)$. Thus, a bright pixel in an image can be assumed that transmission rate is small due to long distance and constant fog.

In the present invention, fog inclusion amount $I_\infty$ of input image is set as the brightest pixel value in the image, transmission is assumed as [equation 5].

$$\tilde{t}(x) = 1 - \frac{\alpha I_h(x)}{I_\infty}, \quad 0 < \alpha \le 1 \quad \text{[Equation 5]}$$

If $\tilde{t}(x)$ estimation value of transmission in [equation 5] is substituted in [equation 3], estimation value of fog-eliminated pixel $\tilde{I}(x)$ as in equation 6 can be obtained by solving the quadratic equation for pixel value of input image $I_h(x)$.

$$\tilde{I}(x) = \frac{I_\infty(\alpha+1)}{2\alpha}\left[1 - \sqrt{1 - \frac{4\alpha I_h(x)}{I_\infty(\alpha+1)^2}}\right] \quad \text{[Equation 6]}$$

If, in case α=1, [equation 6] is simply expressed as [equation 7].

$$\tilde{I}(x) = I_\infty\left(1 - \sqrt{1 - \frac{I_h(x)}{I_\infty}}\right) \quad \text{[Equation 7]}$$

Figure 1:
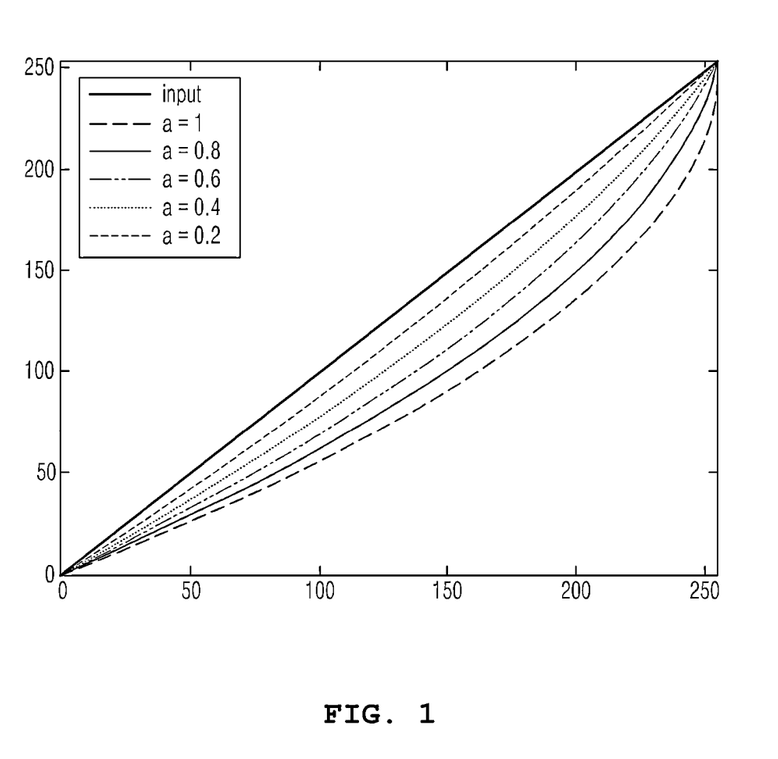
FIG. 1 illustrates the result of brightness value estimation of fog-eliminated pixel according to input parameter for fog reduction estimation model.

FIG. 1 illustrates the result of brightness value estimation of fog-eliminated pixel according to input parameter α for fog reduction estimation model proposed in [equation 6]. It can be observed that strength of fog reduction becomes stronger because the larger α, brightness of input value is decreased more largely.

Estimation value of fog-eliminated pixel obtained from [equation 6] $\tilde{I}(x)$ is substituted again in [equation 2] to obtain estimation value of transmission rate, which is shown as [equation 8].

$$\tilde{t}(x) = \frac{I_h(x) - I_\infty}{\tilde{I}(x) - I_\infty} \quad \text{[Equation 8]}$$

On the other hand, the range of t(x) from [equation 3] is decided as shown in [equation 9] because fog-eliminated image I(x) must satisfy $0 \le I(x) \le I_h(x)$.

$$1 - \frac{I_h(x)}{I_\infty} \le t(x) \le 1, \quad \text{[Equation 9]}$$

wherein $$1 - \frac{I_h(x)}{I_\infty}$$

is lowest limit value of transmission rate.

In the present invention, transmission which is used to obtain fog-eliminated image is calculated by weighted sum of estimation value of transmission rate $\tilde{t}(x)$ in [equation 8] and lowest limit value in [equation 9] as shown in [equation 10].

$$t(x) = \omega\tilde{t}(x) + (1-\omega)\left(1 - \frac{I_h(x)}{I_\infty}\right), \quad 0 < \omega < 1, \quad \text{[Equation 10]}$$

wherein ω is weighted value.

Finally fog-eliminated image is obtained by substituting transmission rate acquired from [equation 10] into [equation 3].

Figure 2:
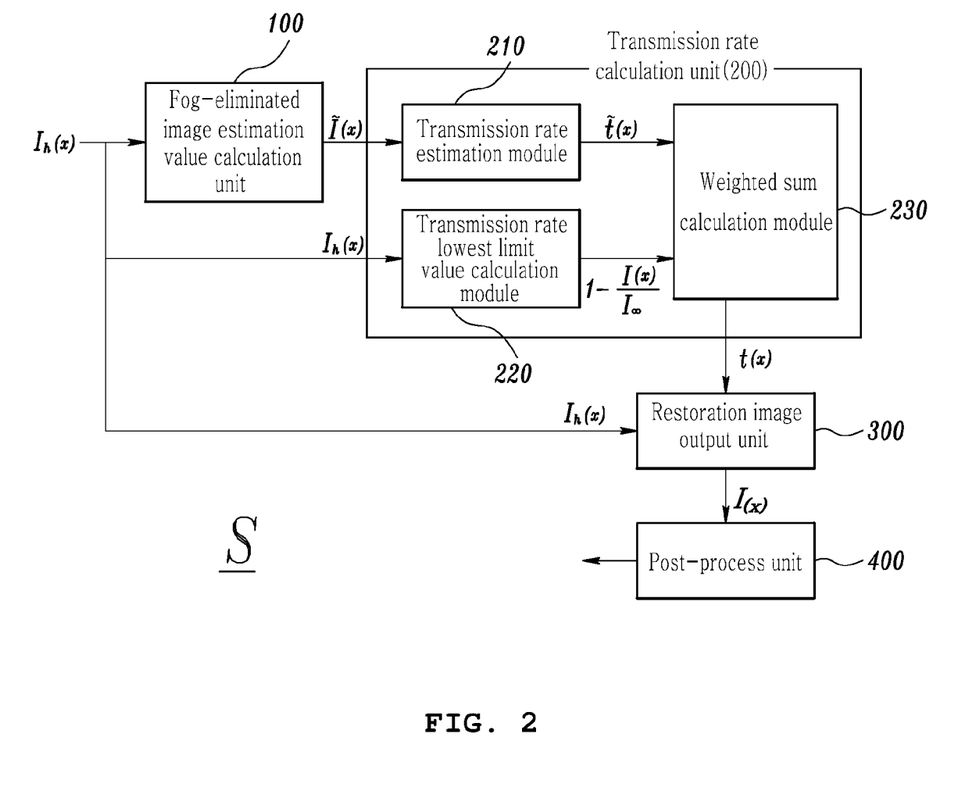
FIG. 2 is an overall diagram conceptually illustrating a system for improving foggy luminance image using fog reduction estimation model according to the present invention.

FIG. 2 is an overall diagram conceptually illustrating system S for improving foggy luminance image using fog reduction estimation model according to the present invention, which comprises fog-eliminated image estimation value calculation unit 100, transmission rate calculation unit 200, restoration image output unit 300, and post-process unit 400 as illustrated.

Fog-eliminated image estimation value calculation unit 100 receives foggy input image $I_h(x)$, and calculates estimation value of fog-eliminated pixel $\tilde{I}(x)$ by using roots of quadratic equation which produces fog-eliminated image by pixel unit.

Herein, fog-eliminated image estimation value calculation unit 100 calculates estimation value of fog-eliminated pixel Ĩ(x) through [equation 6].

Transmission rate calculation unit 200 calculates estimation value of transmission rate and a lowest limit value by pixel unit by using estimation value of the fog-eliminated pixel Ĩ(x) and input image $I_h(x)$, and calculates the transmission rate to be used for restoration of fog-eliminated image by weighted sum of calculated estimation value of transmission rate and a lowest limit value of transmission rate, comprising transmission rate estimation module 210, transmission rate lowest limit value calculation module 220, and weighted sum calculation module 230 as illustrated in FIG. 2.

Specifically, transmission estimation module 210 calculates estimation value of transmission rate t̃(x) through [equation 8] by using estimation value of fog-eliminated pixel Ĩ(x), pixel value of input image $I_h(x)$, fog inclusion amount $I_\infty$ calculated by fog-eliminated image estimation value calculation unit 100, wherein fog inclusion amount $I_\infty$ is set as the brightest pixel value in the image.

Transmission lowest limit value calculation module 220 receives the input image $I_h(x)$ and calculates lowest limit value of transmission rate $$1 - \frac{I_h(x)}{I_\infty}$$

through [equation 9].

Weighted sum calculation module 230 calculates transmission rate t(x) to be used for restoring fog-eliminated image by weighted sum of estimation value of transmission rate t̃(x) and lowest limit value of transmission rate $$1 - \frac{I_h(x)}{I_\infty},$$

through [equation 10] which are calculated respectively through transmission rate estimation module 210 and transmission rate lowest limit value calculation module 220.

Restoration image output unit 300 outputs fog-eliminated restoration image I(x) through [equation 3] using input image $I_h(x)$, and fog inclusion amount $I_\infty$ and transmission rate t(x) calculated by transmission rate calculation unit 200.

Post-process unit 400 performs brightness stretching for image output through restoration image output unit 300, and finally outputs fog-eliminated image I(x).

Figure 3:
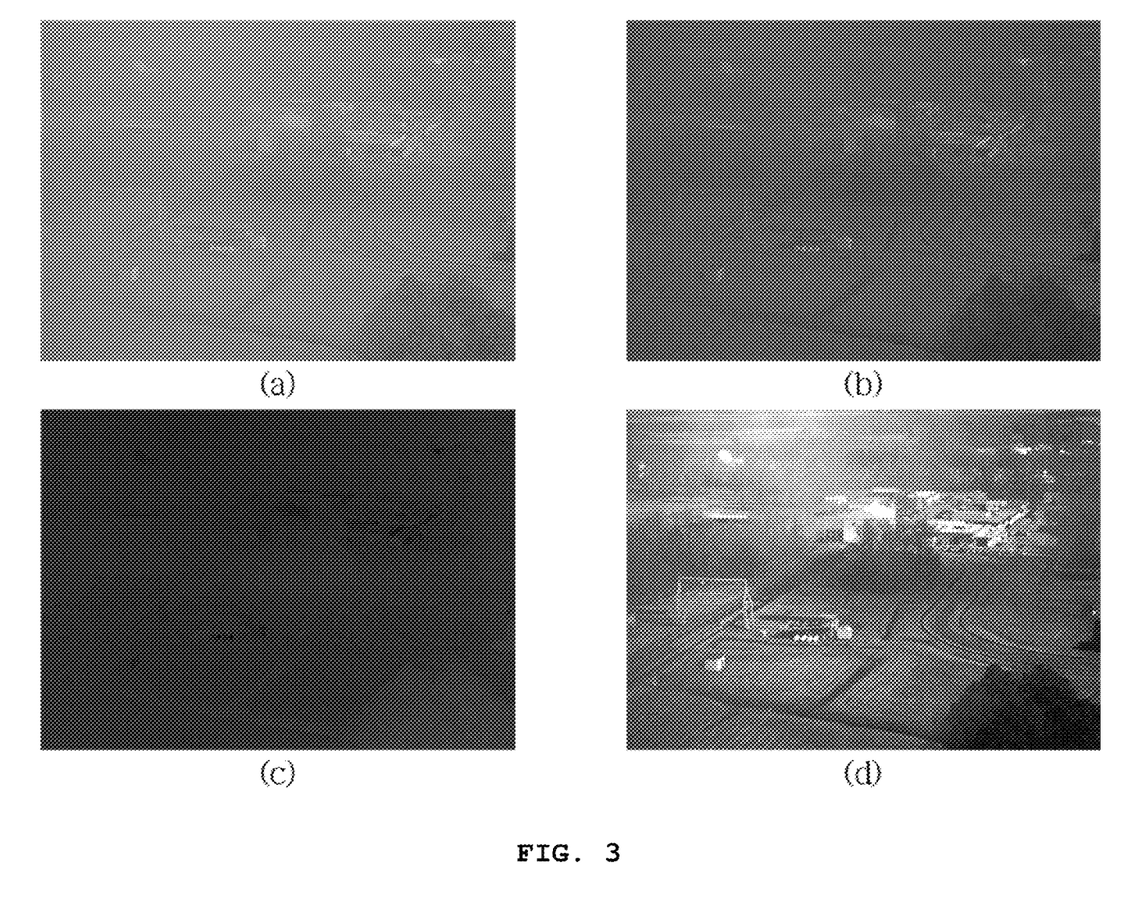
FIG. 3 and FIG. 4 illustrate the result of the simulation of a system for improving foggy image according to the present invention.
Figure 4:
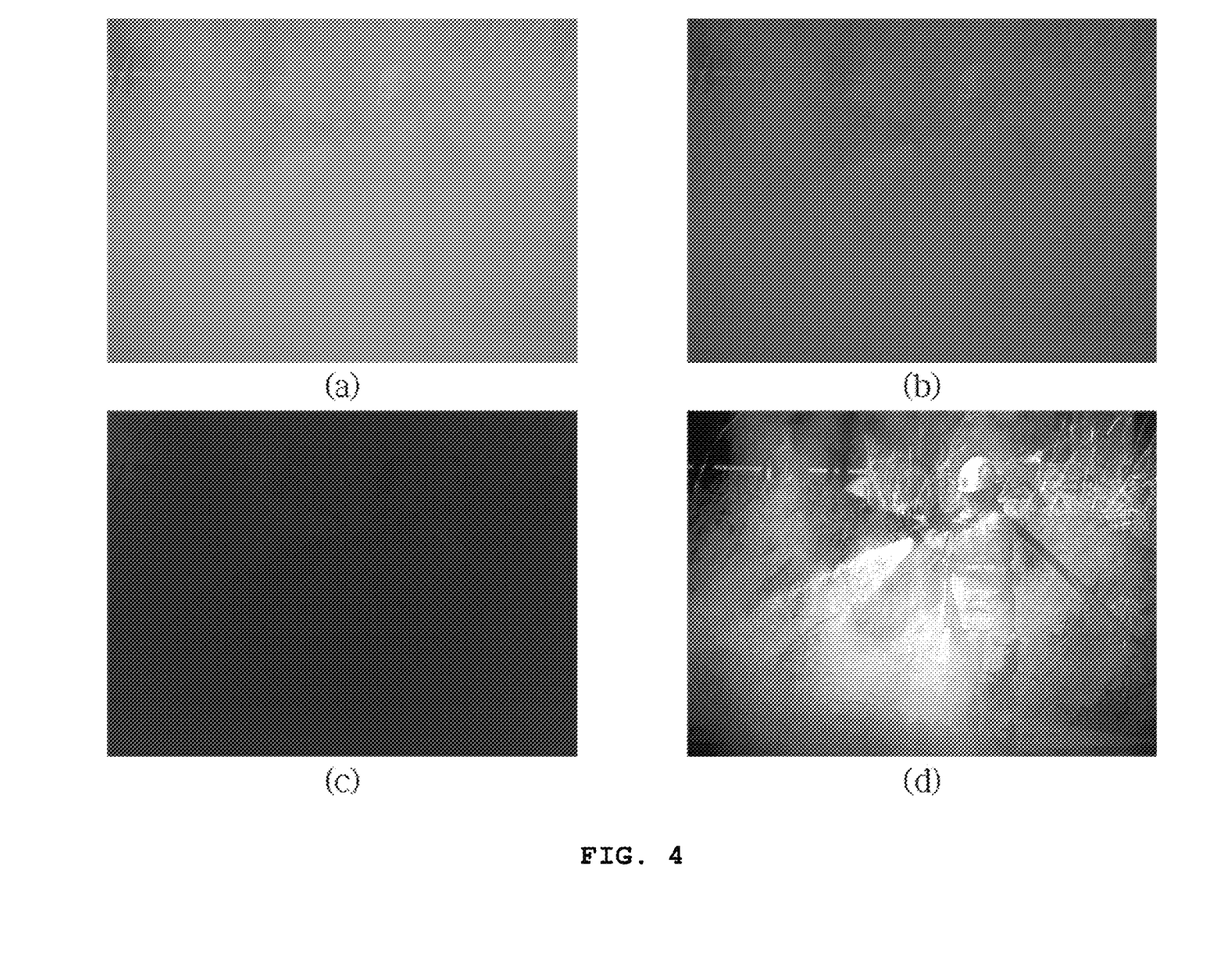

FIG. 3 and FIG. 4 are examples illustrating simulation result of system for improving foggy image. As illustrated, (a) in FIG. 3 and FIG. 4 shows luminance component of foggy image $I_h(x)$, (b) in FIG. 3 and FIG. 4 shows estimation value of fog-eliminated pixel Ĩ(x), when parameter α=1, which is image calculated through [equation 7]. Also, (c) in FIG. 3 and FIG. 4 shows transmission rate t(x) obtained through [equation 10], (d) in FIG. 3 and FIG. 4 is fog-eliminated luminance image through the present invention.

Although the present invention has been described in conjunction with the preferred embodiments which illustrate the technical spirit of the present invention, it will be apparent to those skilled in the art that the present invention is not limited only to the illustrated and described configurations and operations themselves but a lot of variations and modifications are possible without departing from the scope of the spirit of the invention. Accordingly, all of appropriate variations, modifications and equivalents are considered to pertain to the scope of the present invention.

What is claimed is:

1. A system for improving foggy luminance image using fog reduction estimation model, comprising:
   a fog-eliminated image estimation value calculation processor receiving a foggy input image $I_h(x)$, and calculating an estimation value Ĩ(x) of fog-eliminated pixel from which the fog is removed;
   a transmission rate calculation processor calculating an estimation value of transmission rate t̃(x) and a lowest limit value of transmission rate by using the estimation value Ĩ(x) and the foggy input image $I_h(x)$, and calculating the transmission rate t(x) to be used for restoration of a fog-eliminated image I(x) by weighted sum of the estimation value of transmission rate t̃(x) and a lowest limit value of transmission rate; and
   a restoration image output processor restoring the fog-eliminated image I(x) in which the fog is removed, by using the foggy input image $I_h(x)$ and transmission rate t(x) and outputting the fog-eliminated image I(x).

2. The system according to claim 1, further comprising:
   a post-process processor performing brightness stretching for the fog-eliminated image I(x) from the restoration image output processor to output a final fog-eliminated image.

3. The system according to claim 1, wherein the transmission rate calculation processor comprises:
   a transmission estimation processor calculating the estimation value of transmission rate t̃(x) by using the estimation value of fog-eliminated pixel Ĩ(x) calculated by the fog-eliminated image estimation value calculation processor and the foggy input image $I_h(x)$,
   a transmission lowest limit value calculation processor receiving the foggy input image $I_h(x)$ and calculating the lowest limit value of transmission rate $$1 - \frac{I_h(x)}{I_\infty}.$$

and
   a weighted sum calculation processor calculating the transmission rate t(x) to be used for restoring the fog-eliminated image I(x) by the weighted sum of the estimation value of transmission rate t̃(x) and the lowest limit value of transmission rate $$1 - \frac{I_h(x)}{I_\infty},$$

wherein $I_\infty$ is a fog inclusion amount of the foggy input image $I_h(x)$.

4. The system according to claim 3, wherein the transmission estimation processor calculates the estimation value of transmission rate t̃(x) by using a second equation of $$\tilde{t}(x) = \frac{I_h(x) - I_\infty}{\tilde{I}(x) - I_\infty}.$$

5. The system according to claim 3, wherein the weighted sum calculation processor calculates the transmission rate t(x) to be used for restoring the fog-eliminated image I(x) by using a third equation of $$t(x) = \omega \tilde{t}(x) + (1-\omega)\left(1 - \frac{I_h(x)}{I_\infty}\right), \quad 0 < \omega < 1,$$

wherein $\omega$ is a weighted value.

6. The system according to claim 1, wherein the fog-eliminated image estimation value calculation processor calculates and obtains the estimation value of fog-eliminated pixel $\tilde{I}(x)$ by using a first equation of $$\tilde{I}(x) = \frac{I_\infty(\alpha+1)}{2\alpha}\left[1 - \sqrt{1 - \frac{4\alpha I_h(x)}{I_\infty(\alpha+1)^2}}\right],$$

wherein $I_\infty$ is a fog inclusion of the foggy input image $I_h(x)$, and $\alpha$ is an input parameter having a range of $0 \le \alpha \le 1$.

7. The system according to claim 1, wherein the restoration image output processor outputs the fog-eliminated image $I(x)$ by using a fourth equation of $$I(x) = \frac{I_h(x) - I_\infty}{t(x)} + I_\infty,$$

wherein $I_\infty$ is a fog inclusion amount of the foggy input image $I_h(x)$.

* * * * *